No. 683,779. Patented Oct. 1, 1901.
J. LUND.
VELOCIPEDE.
(Application filed Aug. 2, 1900.)
(No Model.)
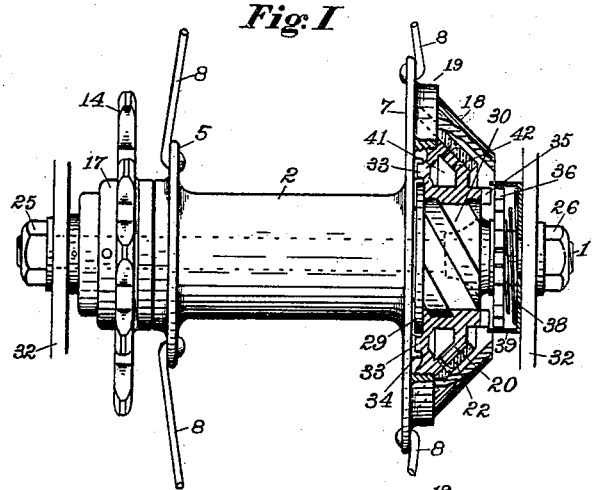
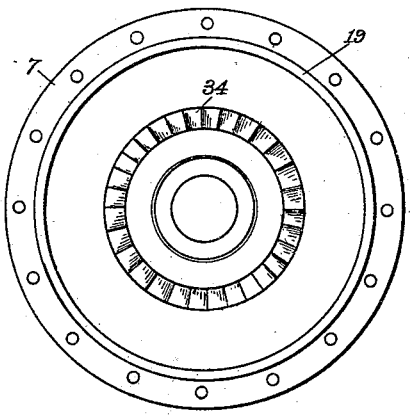
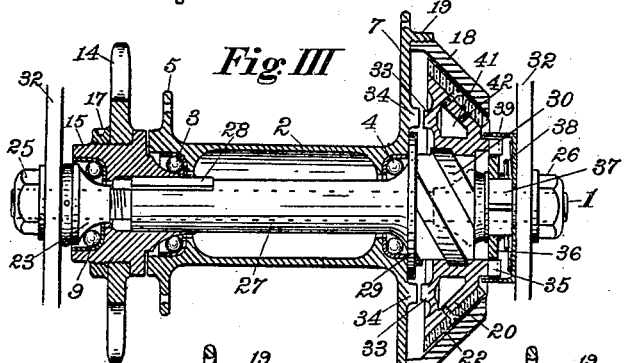
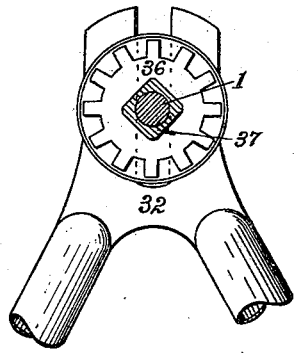
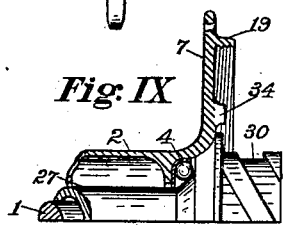
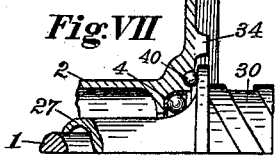
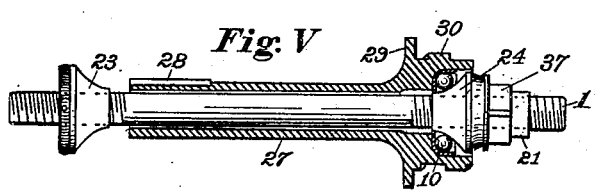
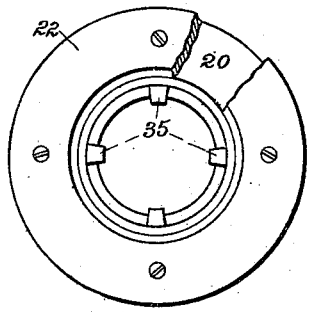
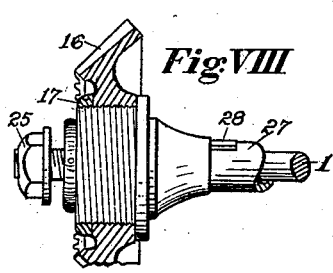
WITNESSES:
INVENTOR:
ATTORNEYS.

UNITED STATES PATENT OFFICE.

JOEL LUND, OF SAN FRANCISCO, CALIFORNIA, ASSIGNOR OF ONE-HALF TO STEPHEN G. CHAPMAN, OF SAME PLACE.

VELOCIPEDE.

SPECIFICATION forming part of Letters Patent No. 683,779, dated October 1, 1901.

Application filed August 2, 1900. Serial No. 25,683. (No model.)

*To all whom it may concern:*

Be it known that I, JOEL LUND, a subject of the King of Sweden and Norway, residing at San Francisco, county of San Francisco, and State of California, have invented certain new and useful Improvements in Velocipedes; and I hereby declare the following to be a full, clear, and exact description of the same, reference being had to the accompanying drawings, forming a part of this specification.

My invention relates to certain improvements in velocipedes and like vehicles, especially to what are known as "bicycles," and to means of retarding and controlling the same in descending grades and when the propelling power is not applied or necessary.

My improvements consist in a simple brake applied in the case of bicycles to the nave or hub of the rear wheel by a slight reverse movement of the pedals or impelling mechanism, such brake being operated, also the driving power transmitted, by a revoluble sleeve around the main spindle of the machine without longitudinal movement of the parts, so constructed and arranged that the braking mechanism involves but two moving parts, a screwed sleeve that communicates the driving power through the nave and a laterally-moving brake-disk through which the propelling power is transmitted, the whole applicable and operative whether the propelling power is transmitted by a chain or by tooth-wheels, as is now common in such vehicles.

My invention further consists in various novel features of a constructive and operative nature that will be fully described in the specification to follow and illustrated in drawings accompanying and forming a part thereof.

The objects of my invention are to provide for arresting the driving mechanism when it is not required, as in descending inclined ways or grades, and to retard and control the rate of progress in such cases—in other words, to attain the functions of what are known as "back-pedaling" brakes for velocipedes by a simple mechanism that is equally operative whatever the nature of the gearing by which the propelling force is transmitted and by means of which the frictional braking devices are applied. To these ends I provide devices as illustrated in the accompanying drawings.

Figure I is a side elevation, partially in section, of the rear hub or nave of a velocipede of the bicycle type arranged to be driven by means of a chain and sprocket-wheels in the usual manner. Fig. II is an end view of the same looking from the left; Fig. III, a central vertical section through Fig. I; Fig. IV, a face view of the brake-clutch plate and a part of the main frame; Fig. V, a longitudinal section through the clutch-operating sleeve and of the main spindle therein; Fig. VI, a face view of the clutch with a portion of its frictional covering broken away; Fig. VII, a modification of Figs. I and II, whereby the thrust of the brake is resisted by a ball-bearing; Fig. VIII, a detail showing the end of the revoluble sleeve and main spindle arranged with a tooth-wheel for transmitting the propelling power thereto; and Fig. IX is a detail in section showing a thrust-collar with curved faces of equal tangents to adapt wear and compensation to the velocity.

Similar numerals of reference are applied throughout to the several corresponding parts.

In the use of pedal-driven vehicles so much of the labor and effort as is due to moving the feet in descending grades is saved by stopping the motion of the cranks or pedals, and if by a reverse movement of these the rate of progress can be controlled such vehicles become much more useful and easy to operate. Such functions are attained in a simple manner by the devices illustrated in the drawings now to be referred to.

1 is the main spindle, which has no movement and is rigidly attached at each side to the main frame. The propelling power is applied to a revoluble sleeve, hereinafter described, that passes through the nave 2 and can be transmitted either by a chain and sprocket-wheels, as in Figs. I and III, or by a gear-wheel, as shown in Fig. VIII, either being suitable, because of there being no end movement of the driven parts, as hereinafter explained.

2 is the nave of the wheel, of tubular form, incasing and protecting the operative parts, supported on the central transmitting-sleeve 27 by the ball-bearings 3 and 4, as shown in Fig. III, and is provided with flanges 5 and 7, to which the wheel-spokes 8 are attached. 9 and 10 are ball-bearings by means of which the whole external structure of the wheel and its connected parts are supported upon the fixed spindle 1, the conical collars 23 and 24 being attached to and, in effect, a portion of this fixed spindle 1, as shown in Figs. III and V.

Referring especially to Fig. III, 14 is a sprocket-wheel to receive a propelling-chain in the usual manner and is rigidly attached to the shell 15 by a screw-thread and following collar 17. This shell 15 is essentially a portion of the transmitting-sleeve 27, as will be hereinafter explained. Referring to the other side of the machine, 18 is a brake shell or collar attached to a projecting ledge 19 on the flange 7 or otherwise attached thereto, and 20 a brake-disk adapted to fit therein covered on its outer surface with some elastic material 22 of a tractive nature, such as celluloid or leather. This brake-disk 20 is fixed or revoluble, accordingly as it is moved to the right or left, and besides performing the functions of a brake also transmits the propelling force to the rear wheel of the vehicle.

The adjustable conical bearing-collars 23 and 24 are screw-threaded upon the main spindle 1 and clamped to prevent their turning by means of the screw-nuts 25 and 26, which also serve to secure this spindle to the main frame 32 in the usual manner.

The movable sleeve surrounding the main spindle 1 is an important member in the combination of devices. It is at one end fitted to slide in the shell 15, but prevented from turning therein by a key or spline 28, as seen in Figs. I and III, and at the other end is provided with a thrust-collar 29 and an externally-screw-threaded extension 30, that fits into a corresponding nut or matrix in the brake-disk 20, so that by partial rotation of the sleeve 27 right and left the disk 20 is moved laterally into and out of contact with the brake-shell 18, as will be hereinafter more fully explained. This sleeve 27 thus becomes an intermediary member between the nave 2 and the fixed central spindle 1 and consists, in effect, of the parts 15, 27, 29, and 30 to transmit the propelling power of the sprocket-wheel 14 to the brake-disk 20 and through that to the nave 2.

On the inner face of the brake-disk 20 there is a serrated or claw clutch 33, that engages a corresponding clutch 34 on the flange 7, (shown most plainly in Fig. II,) and on the outer face of the disk 20 are clutch-teeth 35, (shown in Fig. VI,) that engage a toothed disk 36, (shown in Fig. IV,) so that by moving the disk 20 inwardly or outwardly one or the other of these clutches engages as soon as the other is released.

The toothed disk 36 fits loosely on a squared part 37, made integral with the seat 21 for the main frame 32, and consequently is clamped and held from turning by the nut 26. A coil-spring 38 pushes the tooth-disk 36 inward toward the brake-disk 20, and a thin housing 39, interposed between the frame 32 and the squared part 37, excludes dust and forms a protecting-shield for the clutch.

As the sleeve 27 or the collar 29 thereon and the ball-bearing 4 have to sustain a thrust equal to the lateral force applied to the brake-disk 20, I provide for resisting this thrust in proportion to the intensity and continuance of the force. For use on streets or level roads flat radial surfaces, as in Figs. I and III, answer in practice, or for greater endurance these bearing-surfaces of the collar 29 can be made, as in Fig. IX, corresponding to a curve of equal tangents, or the "Schiele bearing," as it is called, in which wear and compensation are equal to the velocity at all points on the bearing-surfaces. For use in mountains, where the brake may be continuously applied for several miles at a time, I employ a ball-bearing 40, as in Fig. VII, which, in conjunction with the ball-bearing 4, furnishes ample resisting force. Either of these modifications is suitable. They do not form an essential feature of my invention and are described to impart full information thereof.

The brake-disk 20 is made hollow with an annular chamber 41, in which is placed lubricating material that escapes as required through suitable apertures 42 to the brake-covering 22, keeping that soft and preventing screeching when the brake is forcibly applied.

It will be understood that in the case of any of the rolling bearings where balls are shown rollers can be substituted without departing from other features of my invention.

The operation is as follows: When the machine is being impelled forward by the sprocket-wheel 14 or the gear-wheel 16, the sleeve 27 is turned in the same direction, and the screw on the extension 30 draws the brake-disk 20 inward and engages the teeth 33 and 34 so the disk 20 drives the nave 2, giving forward motion to the vehicle in a normal manner. When descending a grade or other case when the propelling power is not applied, the motion of the cranks or pedals and the sprocket-wheels 14 and 16 and the sleeve 27 is stopped and the brake-disk 20 is at once turned forward by action of the wheel and moving outward on the screwed extension 30, disengaging the teeth 33 from the disk 7 and engaging the teeth 35 in the toothed disk 36, locking the brake-disk to the fixed spindle 1. The driving-wheel of the vehicle runs free on the bearings 3 and 4 until retarded by the brake. To apply the brake, the sleeve 27 and its connected parts are turned backward by reversing the motion of the cranks or pedals, and the screw on the extension 30 forces outward the brake-disk 20, locking and stopping its rotations by the clutch-teeth 35 and forcing it into the shell 18, causing a frictional resistance of the latter and of the wheel in proportion to the power applied, retarding the vehicle accordingly. When propelling power is to be again applied, the sleeve 27 is turned forward by applying the cranks or pedals, the screw on the extension 30 moves the disk 20 inward, disengaging the teeth 35 on its outer face and engaging the teeth 33 on its inner face, and it begins to drive the wheel in a forward direction. When the brake-disk 20 is moved outward and engages with the toothed wheel or disk 36, this latter slides back on the squared seat 37, compressing the spring 38, such movement being provided to permit a variable lateral range of the disk 20, and thus compensate for wear on the brake-surfaces. To avoid disturbance of the driving-wheels 14 or 16 or of the shell 15 by adjustment for wear of the bearings 9 and 10, such adjustment is made from the right-hand end of the spindle 1 by means of the nut 26, the sleeve 27 sliding in the part 15 accordingly. In this manner of operating it will be seen there are but two principal moving parts required and no ball or roller clutches are necessary, and also that the construction falls within the usual space occupied by corresponding parts as now existing in common practice.

Having described the nature and objects of my invention and manner of constructing the same, I claim as my invention—

1. In a velocipede, a fixed central spindle, a revoluble sleeve on said spindle, longitudinally movable thereon, a driving-wheel revolubly mounted on said spindle, in splined engagement with said sleeve, a hollow nave revolubly mounted on said sleeve, a laterally-movable frictional brake-disk on said sleeve, means for moving said brake-disk laterally in either direction by the rotation of the sleeve, an overhanging brake-shell on said nave, inclosing said disk, for engaging the latter on its outward lateral movement, face-clutches between said disk and the rotary nave for engaging the driving mechanism with the said nave, and face-clutches between said disk and the stationary frame for arresting the rotary movement of the brake-disk, substantially as specified.

2. The combination of the fixed central spindle, a sleeve revolubly mounted on said spindle, a driving-wheel in splined engagement with said sleeve, a hollow wheel-nave revolubly mounted on said sleeve, antifriction-bearings between said spindle and sleeve and said sleeve and nave, braking mechanism between said wheel and nave on the end opposite the driving-wheel, and means between said sleeve and said brake mechanism whereby the wheel is rotated in forward movement of the driving mechanism and arrested in relatively backward movement of said driving mechanism, substantially as specified.

3. The combination of a fixed central spindle, a sleeve revolubly mounted thereon, a driving-wheel in splined engagement with said sleeve, at one end thereof, a friction brake-disk at the other end of said sleeve, with means for laterally moving said disk by the rotary movements of the sleeve, a wheel-nave revolubly mounted on said sleeve, a flange on said nave bearing an overhanging friction-shell inclosing the brake-disk, for lateral engagement with the same, and face-clutches between said nave-flange and the brake-disk, and clutch-teeth between said brake-disk and the stationary frame respectively, whereby the lateral movements of said brake-disk cause the same to engage alternately the wheel-nave to rotate the same, and the fixed frame to arrest the rotation of the brake-disk, substantially as specified.

4. The combination of a fixed central spindle, a sleeve revolubly mounted thereon, a shell 15 removably splined to said sleeve and rotating therewith, a driving-wheel mounted on said shell, a wheel-nave revolubly mounted on said sleeve, bearing a flange and a brake-shell at one end thereof, teeth 34 on said flange, a screw-formed extension on the end of said sleeve within said brake-shell, fixed detents 36 on the frame, a brake-disk mounted on said screw-formed extension bearing clutch-teeth 33, 35, adapted to be moved laterally thereby in either direction by the rotary movements thereof, said brake-disk co-operating with the said flange and brake-shell to rotate the wheel-nave and with said fixed detents to retard the rotary motion thereof, substantially as specified.

5. The combination of a fixed central spindle, a sleeve mounted revolubly thereon, screw-threaded at one end, and in splined engagement with driving mechanism at the other end, a brake-disk on said screw-threaded end adapted to be laterally moved by the rotary movements of the same, a hollow wheel-nave revolubly mounted on said sleeve, flanges 5, 7 on said nave, an overhanging brake-shell 18 on flange 7, inclosing said brake-disk, face-clutches between said disk and flange 7, whereby the disk engages with the wheel-nave and communicates to it the rotary motion derived from the driving-gear, and means for holding the brake-disk from turning when the sleeve is reversed, substantially as specified.

6. The combination of a revoluble member, engaged by driving mechanism at one end and screw-threaded at the other end, a friction brake-disk mounted on said screw-threaded end, to be laterally moved by the rotary motions thereof, a wheel-nave revolubly mounted on said revoluble member, flanged at one end and provided on said flange with an overhanging brake-shell inclosing said brake-disk, face-clutches between said flange and said brake-disk whereby when engaged the driving mechanism is connected with the revoluble nave, and means between said brake-disk and the stationary frame whereby the movement of the brake-disk is arrested when said screw-threaded member is forcibly reversed in motion, substantially as specified.

7. The combination of a fixed central spindle, a sleeve revolubly mounted thereon, a revoluble shell 15 splined upon said sleeve at one end thereof, rotating with the same and longitudinally movable thereon, a driving-wheel mounted on said shell 15, a revoluble nave mounted on said sleeve, a brake-disk between said nave and said sleeve at the end opposite shell 15, a screw-threaded extension 30 upon the said sleeve in engagement with said brake-disk, clutch devices between said brake-disk and the frame whereby said disk is applied to the rotation of the wheel or to the arrest of such rotation according to the direction of rotative impulse applied to said sleeve, substantially as specified.

8. The combination of a frame, a fixed spindle, a driving-wheel, a flanged wheel-nave, a sleeve mounted on said spindle in splined engagement with the driving mechanism at one end and screw-threaded at the other end, a friction brake-disk mounted on said screw-threaded end to be laterally moved by the rotary movements thereof, a rotary wheel-flange with brake-shell inclosing said brake-disk, face-clutches 33, 34, between said wheel-flange and said brake-disk, face clutch-teeth 35 on the outer side of said brake-disk, a non-revoluble toothed disk 36 borne on the stationary frame, adapted for engagement with clutch-teeth 35, and a spring 38 for pressing said toothed disk inward, substantially as specified.

9. The combination of a frame, a fixed spindle, a driving-wheel, a flanged wheel-nave, a sleeve on said spindle in splined engagement with the driving mechanism at one end and screw-threaded at the other end, at 30, brake-shell 18, brake-disk 20 mounted on screw-threaded portion 30, to receive lateral motion from the rotary movements thereof, face-clutches between brake-disk 20 and wheel-flange 7, clutch-teeth 35 on the outside of brake-disk 20, toothed disk 36 non-revolubly mounted on a portion of the main frame, and laterally movable thereon, a spring behind said toothed disk, and a housing 39 inclosing the said disk and spring, substantially as specified.

10. The combination of revoluble hollow nave 2, having flange 7 and overhanging brake-shell 18, rotary brake-disk 20 within said brake-shell, clutch-teeth 33, 34, between said brake-disk and said flange, clutch-teeth 35, 36, between said brake-disk and the fixed frame, and a revoluble member 27 within said nave connected with driving mechanism at one end and provided at the other end with means in engagement with said brake-disk whereby the latter is shifted laterally according to the rotative direction of said member 27, to engage with the wheel-nave to rotate the same, or be disengaged to admit of the free rotation of the same, or be forcibly engaged with brake-shell 18 to retard the motion of wheel-nave 2, substantially as specified.

In testimony whereof I have signed my name to this specification in the presence of two subscribing witnesses.

JOEL LUND.

Witnesses:
P. W. J. LANDER,
ELMER WICKES.